US008560090B2

(12) United States Patent
Sasaki et al.

(10) Patent No.: US 8,560,090 B2
(45) Date of Patent: Oct. 15, 2013

(54) MONITOR AND CONTROL APPARATUS

(75) Inventors: Tomoaki Sasaki, Tsu (JP); Kei Miura, Tsu (JP); Keisuke Yoshikawa, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 608 days.

(21) Appl. No.: 12/659,786

(22) Filed: Mar. 22, 2010

(65) Prior Publication Data
US 2010/0250016 A1 Sep. 30, 2010

(30) Foreign Application Priority Data

Mar. 26, 2009 (JP) .................................. 2009-077656

(51) Int. Cl.
*G06F 19/00* (2011.01)

(52) U.S. Cl.
USPC ................... 700/19; 700/17; 700/22; 700/83; 715/700

(58) Field of Classification Search
USPC ........... 700/17, 83, 19, 22; 715/700; 345/173, 345/184, 641
See application file for complete search history.

(56) References Cited

U.S. PATENT DOCUMENTS 5,233,511 A * 8/1993 Bilas et al. ...................... 700/17
5,455,505 A * 10/1995 Laplace et al. .................. 323/343
5,642,290 A * 6/1997 Reilly et al. ..................... 700/298
6,310,547 B1 10/2001 Parker
6,967,565 B2 * 11/2005 Lingemann ................. 340/12.23
7,228,186 B2 * 6/2007 Karschnia et al. ............... 700/19
2001/0014832 A1* 8/2001 Hatemata et al. ................ 700/16
2004/0098148 A1* 5/2004 Retlich et al. .................... 700/83

FOREIGN PATENT DOCUMENTS

| JP | H07212851 | 8/1995 |
| JP | H09261777 | 10/1997 |
| JP | 2001175306 | 6/2001 |
| TW | 552486 | 9/2003 |

OTHER PUBLICATIONS

The Japanese office action dated Jan. 18, 2011 and English summary thereof.
Office Action dated Mar. 18, 2013, issued in corresponding Taiwan application No. 0991 08349.

* cited by examiner

*Primary Examiner* — Kavita Padmanabhan
*Assistant Examiner* — Douglas Lee
(74) *Attorney, Agent, or Firm* — Bacon & Thomas, PLLC

(57) ABSTRACT

There is provided a monitor and control apparatus capable of enlarging a volume of a body, while ensuring a space for routing signal lines between a rear face of the body and a bottom surface of a mounting hole. The body 5 has a rear face including: a first face having terminal sections protruded; and a second face protruded backwardly relative to the first face by a stepped portion. An internal space of the body on the second face side is enlarged backwardly more than that on the first face side. The stepped portion is formed in the middle of the rear face of the body in the horizontal direction, which defines a right-half portion as the first face, and a left-half portion as the second face.

3 Claims, 13 Drawing Sheets

MONITOR AND CONTROL APPARATUS

FIELD OF THE INVENTION

The invention relates to a monitor and control apparatus used for a remote monitoring control system for monitoring and controlling a load through communication.

BACKGROUND OF THE INVENTION

Conventionally, there is known a technique in that, in order to monitor and control a load remotely, transmission signals including ON/OFF information of switches are transmitted through signal lines to turn on and off a relay for switching on and off power supply to a load.

This kind of a remote monitoring control system is configured to be a central control type, which includes: a terminal unit provided with an operation terminal device having a switch, and a control terminal device having a relay for switching on and off power supply to a load; and a central unit serving as a transmission unit. In the remote monitoring control system, a plurality of operation terminal devices and a plurality of control terminal devices may be provided. The transmission unit, the operation terminal device, and the control terminal device are connected through two-wired signal lines, and the transmission unit can recognize the operation terminal device and the control terminal device individually by using a terminal address set for each of the operation terminal device and the control terminal device.

Further, the transmission unit is provided with a memory storing a control table that serves as a data table in which the operation terminal devices are associated with the control terminal devices through addresses. When receiving the ON/OFF information of the switch from any of the operation terminal devices through transmission signals (using time division multiplex transmission signals), the transmission unit transmits an instruction for turning on and off a relay to the control terminal device associated with the operation terminal device by the control table through the transmission signals. And then, the control terminal device receiving the instruction turns on and off the relay. Thus, the load is controlled according to ON/OFF operations of the switch.

Such a remote monitoring control system includes a monitor and control apparatus capable of monitoring and controlling multiple loads at one place, the monitor and control apparatus being connected with signal lines (see, e.g., Japanese Patent Laid-open Application No. 10-243478, Patent Document 1).

The monitor and control apparatus described in Patent Documents 1 is provided with a body including: a display part having a liquid crystal display; and an operation part having transparent touch switches that are arranged to be superimposed on a screen of the display part. By touching the switches displayed on the screen of the display part, a user can control loads corresponding to the switches. Moreover, operation conditions of the respective loads as a control target are displayed on the display part. In the monitor and control apparatus, the user can manipulate multiple switches by changing the contents displayed on the display part, which reduces a space to be occupied by the switches compared with the case where the multiple switches are disposed individually.

A terminal unit, used for a remote monitoring control system by being connected with signal lines, includes the display part and the operation part as described in the above monitor and control apparatus. The terminal unit is, as shown in FIG. 10A, generally attached to an installation surface such as a wall in such manner that a front face of a body 5' provided with a display part 2' and an operation part 3' is exposed and a rear portion of the body 5' is inserted into a mounting hole H2 (see FIG. 11) that is opened in the installation surface. In fitting this kind of the terminal unit 1', an embedded box for fitting an embedded-type wiring accessory is used. Specifically, the terminal unit 1' is attached to the wall by fixing the body 5' in the embedded box SB that is embedded in the wall as shown in FIG. 11. In this way, the display part 2' and the operation part 3' in the front side of the body 5' can be recognized visually and operated, while minimizing an amount of a protrusion thereof from the wall surface W0 (see, e.g., Japanese Patent Laid-open Application No. 2007-251671, Patent Document 2).

In the terminal unit 1' with such configuration, terminal sections T1 to T6 for connecting signal lines or the like are usually provided in the rear face of the body 5' as shown in FIG. 10B. Since the signal lines are routed within the mounting hole H2, good appearance can be obtained when the terminal unit 1' is attached to the installation surface. The terminal sections T1 to T6 are each provided with: a connecting terminal 21 having a terminal strip 21a and a terminal screw 21b; and an insulating wall 22 provided erectly between the adjacent connecting terminals 21, wherein the connecting terminal 21 and the insulating wall are protruded from the rear face of the body 5'. Therefore, between the rear face of the body 5' and the bottom surface of the mounting hole H2 (the bottom surface of the embedded box SB), there is provided a space for routing the signal lines connected with the terminal boxes T1 to T6 around the terminal boxes T1 to T6. For this reason, as shown in FIG. 11, a depth dimension of the mounting hole H2 opened in the installation surface needs to be larger than a dimension "α" obtained by adding a height dimension of the terminal sections T1 to T6 (the protruding amount thereof from the rear face of the body 5') to a thickness dimension from the installation surface to the rear face of the body 5' (in the forward and backward direction) in the state where the body 5' is attached to the installation surface.

The depth dimension of the mounting hole H2, however, are restricted by such as a depth dimension of the embedded box SB embedded in the wall. Thus, the dimension "α", which is an amount of inserting the body 5' into the mounting hole H2, is restricted ("α" is 30 mm or less in the example of FIG. 11), so that a depth dimension (in the forward and backward direction) of the body 5' is hard to be increased. On the other hand, the monitor and control apparatus is desired to be multi-functionalized, for example, by adding an address setting function. As described above, however, the depth dimension of the body 5' is restricted, which limits a volume of the body 5'. Accordingly, the number of components accommodated in the body is hard to be increased, which makes it difficult to have the monitor and control apparatus multi-functionalized. Besides, there is another disadvantage in that the high-density arrangement of the components in the body deteriorates heat dissipation properties.

SUMMARY OF THE INVENTION

In view of the above, an object of the invention is to provide a monitor and control apparatus capable of enlarging a volume of a body more than that of a conventional configuration, while ensuring a space for routing signal lines connected to terminal sections between a rear face of the body and a bottom surface of a mounting hole.

In accordance with one aspect of the invention, there is provided a monitor and control apparatus connected with signal lines to be used for a remote monitoring control system for monitoring and controlling a load via the signal lines, which includes:

a body with a box-like shape attached to an installation surface in such a way that a front face of the body is exposed and a rear portion thereof is inserted into a mounting hole opened in the installation surface;

a display part for displaying graphic images;

an operation part through which a user inputs an operation instruction;

a control part for performing a display control of the display part and a load control according to the operation instructions through the operation part; and a communication circuit for transmitting communication commands for monitoring and controlling a plurality of loads, wherein the display part, the operation part, the control part and the communication circuit are provided in the body and the display part and the operation part are provided on the front face side of the body, wherein a rear face of the body includes: a first face having terminal sections that are protruded, the signal lines being connected to the terminal sections; and a second face protruded backwardly relative to the first face by a stepped portion formed between the first face and the second face, and wherein an internal space of the body on the second face side is more enlarged backwardly than that on the first face side, and a height dimension of the second face from the first face is substantially equal to a height dimension of the terminal boxes from the first face.

Since the internal space of the body on the second face side is enlarged backwardly more than that on the first face side and the height dimension of the second face from the first face is substantially equal to that of the terminal sections from the first face, the volume of the body is enlarged by an amount of the second face protruded backwardly from the first face, compared with a volume of a conventional configuration. Accordingly, the number of components accommodated in the body can be increased. Besides, the heat dissipation properties of the body can be improved due to the increased space between the components. Moreover, between the first face and the bottom surface of the mounting hole, there is provided a gap having at least the height dimension of the terminal sections from the first face, so that a space for routing the signal lines connected to the terminal sections is ensured around the terminal sections.

Preferably, the body is configured to have a width dimension of two serial modules, which is twice a width dimension of a single serial module, wherein the width dimension of the single serial module is equivalent to that of a three-piece module standardized for an embedded type wiring accessory. The stepped portion is formed to divide the rear face of the body into two parts each of which has the width dimension of the single serial module.

With such configuration, since the rear face of the body is divided into two parts, i.e., the first face and the second face, by the width dimension of the single serial module, the space for routing signal lines connected to the terminal boxes is ensured between the first face and the bottom surface of the mounting hole.

It is preferred that the body has one or more heat dissipation holes opened in the second face to allow the internal space of the body to communicate with an external space.

With this configuration, a heat generated in the internal space of the body can be dissipated to the outside through the heat dissipation holes, so that the heat dissipation properties of the body can be improved advantageously. Especially, a component having a great heat generation value can be accommodated in the body on the second face side where the accommodation space is increased in a forward and backward direction. Therefore, it is possible to efficiently dissipate the heat generated in such component through the heat dissipation holes opened in the second face.

It is preferred that the plurality of terminal sections are arranged in parallel along the rear face of the body in a first direction perpendicular to a second direction in which the first face and the second face are arranged side by side. Further, the body has a plurality of guide grooves formed in the second face to correspond to the respective terminal sections, the guide grooves extending along the second direction over an entire width of the second face.

With such configuration, even in the case where the second face and the bottom surface of the mounting hole are brought into contact with each other, the signal lines connected to the each terminal box can be drawn out of the second face side through the plurality of guide grooves that are provided in the second face. This gives an advantage in that the signal lines can be routed in various directions with high work efficiency.

In accordance with the present invention, the second face is located backward from the first face, so that the volume of the body is enlarged more than that of a conventional configuration while ensuring the space for routing signal lines connected to the terminal sections between the rear face of the body and the bottom surface of the mounting hole.

BRIEF DESCRIPTION OF THE DRAWINGS

FIGS. 1A and 1B show a configuration of a monitor and control apparatus in accordance with a first embodiment of the present invention, wherein FIGS. 1A and 1B are perspective views seen from a front side and a rear side, respectively;

FIGS. 10A and 10B show a conventional example, wherein FIGS. 10A and 10B are perspective views seen from a front side and a rear side, respectively.

DETAILED DESCRIPTION OF THE EMBODIMENTS

Figure 2:
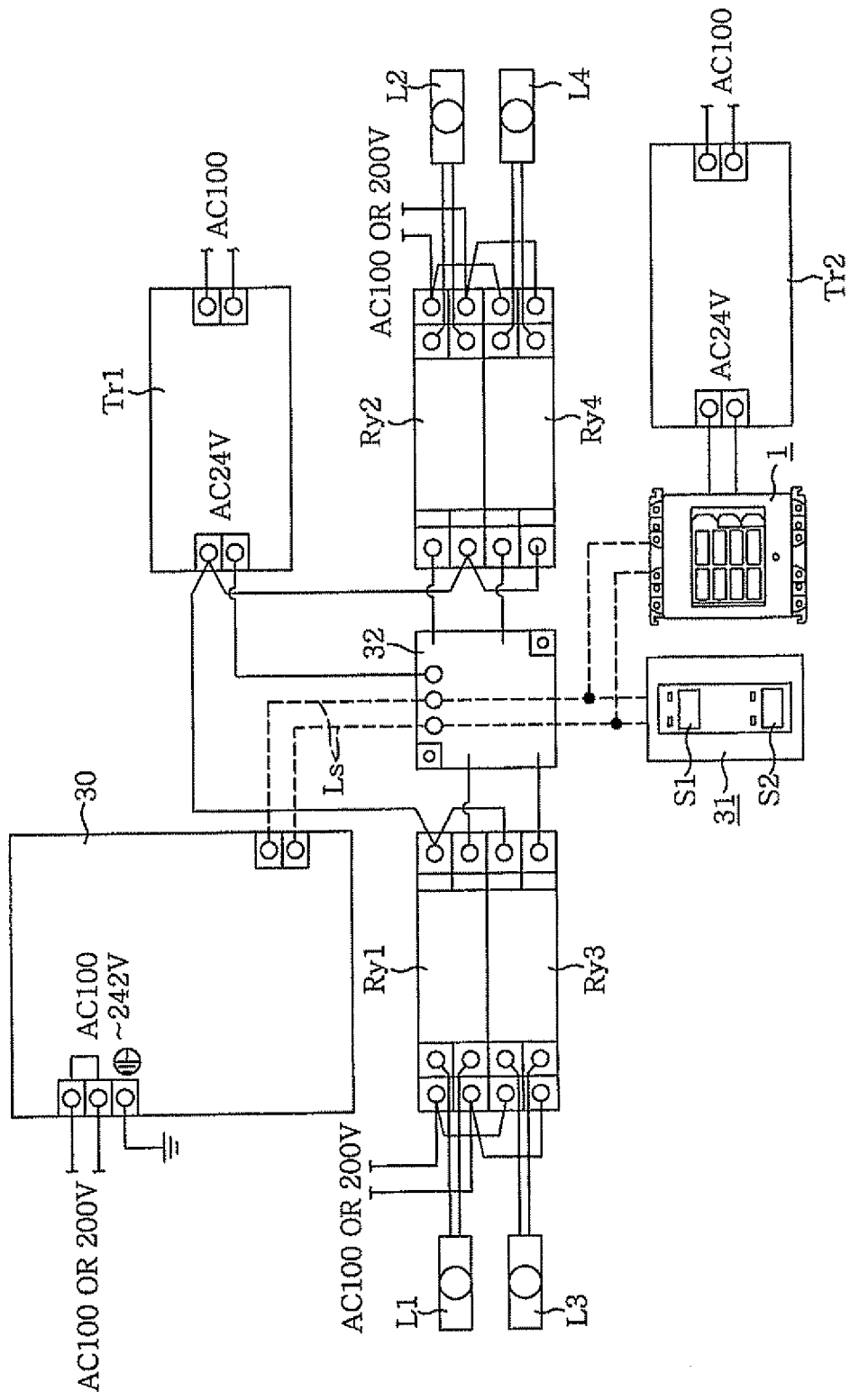
FIG. 2 is a view showing a configuration of a remote monitoring control system using the monitor and control apparatus.

The monitor and control apparatus described in the following embodiments is used for a remote monitoring control system as shown in FIG. 2. The basic configuration of the remote monitoring control system is the same as that of the remote monitoring control system described in the background art.

Specifically, lighting apparatuses L1 to L4 are provided as loads in an example of FIG. 2. The lighting apparatuses are connected to respective remote control relays Ry1 to Ry4, and the respective remote control relays are turned on and off for switching on and off a supply of a power (e.g., AC 100V or 200V). Thus, ON/OFF of the lighting apparatuses L1 to L4 is controlled. The ON/OFF control of the remote control relays Ry1 to Ry4 is performed by a control terminal device 32 that is connected to the remote control relays Ry1 to Ry4. Here, the remote control relays Ry1 to Ry4 are driven by a power source of AC 24V, which is lowered from a commercial power source (e.g., AC 100V) through a remote control transformer Tr1.

The control terminal device 32 is connected to a transmission unit 30 via two-wired signal lines Ls. In addition to the control terminal device 32, the monitor and control apparatus 1 in accordance with the present invention and an operation terminal device 31 provided with a plurality of switches S1, S2 are connected to the signal lines Ls. In the example of FIG. 2, it is illustrated that one control terminal device 32 and one operation terminal device 31 are connected to the signal lines Ls, but in practice, two or more devices are connected thereto. The transmission unit 30, which receives a power (e.g., AC 100V or 200V) from a commercial power source, sends out transmission signals to the signal lines Ls periodically. As the transmission signals, for example, a bipolar pulse-width-modulated signal of ±24V is used. Such transmission signals are full-wave rectified to be used for an internal power source of the monitor and control apparatus 1, the control terminal device 32, and the operation terminal device 31. As for the monitor and control apparatus 1, another remote control transformer Tr2 may be connected additionally. When electric power of the whole system becomes insufficient, the additional remote control transformer Tr2 may supply the power of AC 24V.

The operation terminal device 31 and the control terminal device 32 are associated with each other through addresses. The transmission unit 30 is provided with a control table showing an association relation between the addresses. Since the operation terminal device 31 has a plurality of switches and a plurality of loads is connected to the control terminal device 32, the switches can be associated with the respective loads in the control table provided in the transmission unit 30. However, in the case where, for example, the operation terminal device 31 has a plurality of switches and one intrinsic terminal address, it is impossible to specify one switch that has been operated actually because all the switches provided in the operation terminal device 31 are specified.

Accordingly, in the present embodiment, a load number is assigned for every switch S1, S2 in the operation terminal device 31, and an address of each of the switches S1, S2 is represented by adding the corresponding load number behind the terminal address of the operation terminal device 31. Therefore, the only one switch S1, S2 that has been operated actually can be specified. Similarly, in the control terminal device 32, a load number is assigned for every load, and an address of each of the loads is represented by adding the corresponding load number behind the terminal address of the control terminal device 32. Note that a plurality of loads connected to one control terminal device 32 may be defined as one load. In this case, the terminal address of the control terminal device 32 is defined as an address of the load.

Meanwhile, in the control table, the switches and the loads may be associated with each other in one-to-many relationship other than one-to-one relationship. For instance, when it is supposed that the remote monitoring control system turns on and off power supply to lighting apparatuses as a target load, not only an individual control in which one switch turns on and off one lighting apparatus L1, but also a collective control in which one switch turns on and off a plurality of lighting apparatuses L1 to L4 collectively are selectable in the transmission unit 30. In other words, the individual control means to control one load by one operation, and the collective control means to control a plurality of loads by one operation. In such collective control, there are a group control and a pattern control. In the group control, a range of the loads to be controlled is associated with the switch in advance, and then the loads in the range are turned on/off by operating one switch collectively. In the pattern control, a range of the addresses of the loads to be controlled is associated with respective ON/OFF states of the load corresponding to each of the addresses in advance, and then the respective loads in the range are turned on/off by operating one switch.

An operation of the remote monitoring control system will be described briefly in the following.

The transmission unit 30 always performs a polling operation in which a transmission signal having the terminal address changed cyclically is sent out to the signal lines Ls periodically. As the transmission signal, there is used a bipolar signal, which includes:

a start pulse indicating a signal transmission start;

a mode data showing a signal mode;

address information transmitting a terminal address for calling the operation terminal device 31 and the control terminal device 32 separately;

control data to be transmitted for controlling loads (which include load numbers);

checksum data for detecting a transmission error; and a signal return period that is defined as a time slot receiving the returned signals from the operation terminal device 31 or the control terminal device 32.

When a monitoring signal is inputted in any of the operation terminal devices 31 by such as operating the switch, the operation terminal device 31 sends out to the signal lines Ls an interrupt signal in synchronization with the start pulse of the transmission signal. The operation terminal device 31, which has sent out the interrupt signal, becomes a latch state to set an interruption flag. On the other hand, when detecting the interrupt signal, the transmission unit 30 sends out a transmission signal for changing the mode data into a search mode. When receiving the transmission signal of the search mode, the operation terminal device 31, which is in the latch state, returns a terminal address thereof within a signal-return period. The transmission unit 30, which has received the terminal address, requires the operation terminal device 31 corresponding to the terminal address to return a transmission signal of being in the latch state. Then, the transmission unit 30 checks whether or not the operation terminal device 31 has sent out the interrupt signal by means of checking whether or not the operation terminal device 31 is in the latch state.

When checking that the operation terminal device 31 has sent out the interrupt signal, the transmission unit 30 changes the mode data into a monitoring mode. Then, the transmission unit 30 sends out a transmission signal having the obtained address data to the signal lines Ls. Responding to the transmission signal, the operation terminal device 31 returns the information to be transmitted within the signal-return period. Finally, the transmission unit 30 transmits a transmission signal for releasing the latch state, and then the latch state of the operation terminal device 31 is released.

When receiving the request from the operation terminal device 31, the transmission unit 30 requires the control terminal device 32, which is associated with the operation terminal device 31 according to the control table, to control the load. Next, the transmission unit 30 sends out a transmission signal for checking an operation condition of the load to be controlled and causes the control terminal device 32 to return the load condition. The load condition received from the control terminal device 32 is transmitted via the transmission signal from the transmission unit 30 to the operation terminal device 31 in which the monitoring signal has been inputted. The operation terminal device 31 displays the load condition of the controlled target by such as an indication lamp for indicating ON/OFF conditions.

In the remote monitoring control system described above, when a switch in the operation terminal device 31 is operated, the address (terminal address+load number) of the switch is collated with the control table of the transmission unit 30. Then, the transmission unit 30 transmits a transmission signal for requiring the control terminal device 32, which is connected to the load associated with the switch, to control the load. With such operation, the ON/OFF information of the switch can be reflected upon the load control.

(First Embodiment)

Figure 3:
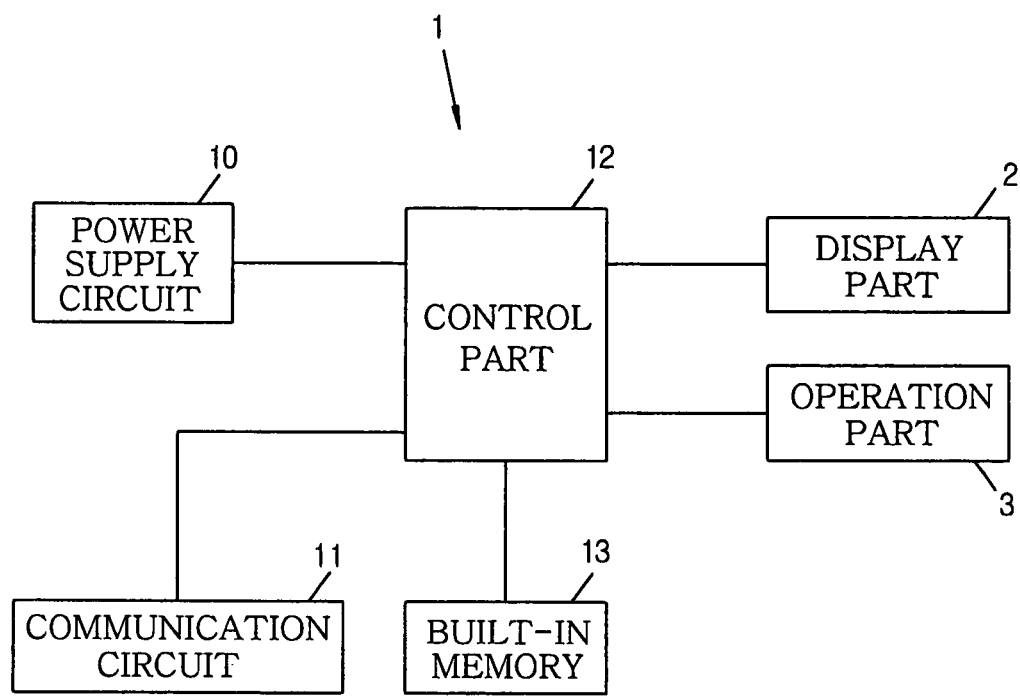
FIG. 3 is a schematic block diagram of the monitor and control apparatus.

A monitor and control apparatus 1 in accordance with a first embodiment of the present invention is, as shown in FIG. 3, provided with: a display part 2 having a liquid crystal display and a backlight integrated with the liquid crystal display; and an operation part 3 having a transparent touch switch of a plate-like shape overlaid on the screen (front face) of the display part 2.

The display part 2 is of a matrix display type in which a large number of pixels are arranged vertically and horizontally in a matrix to display graphic images in color by combining the pixels. The operation part 3 is configured to be a touch switch in which a large number of contact parts that are formed of transparent electrodes, which serve as pressure sensitive resistance elements, are arranged on a transparent sheet member to detect a portion where a finger or the like touches the transparent sheet member. Thus, the display part 2 and the operation part 3 constitute a touch panel display. Here, each of the display 2 and the operation part 3 may be constituted by another configuration different from the above mentioned ones.

In the touch panel display receiving an operation input of a user, operation buttons b1 to b8 (see FIG. 4) displayed on the screen of the display part 2 determine the switches for controlling the loads. Namely, the user can control the load associated with the switch by touching the switches (operation buttons b1 to b8) on the screen of the display part 2.

The monitor and control apparatus 1 is provided with: a power supply circuit 10 supplying DC power to an internal circuit; a communication circuit 11 connected to signal lines Ls that are connected to the transmission unit 30 and receiving the transmission signals (communication commands); and a control part 12 for performing a display control of the display part 2 and a load control according to an operation input of the operation part 3. The control part 12 includes a microcomputer as a main part, which works according to programs and data written in a built-in memory 13 of the monitor and control apparatus 1. The built-in memory 13 is also used as a memory for memorizing the address (terminal address+load number) which is set for every switch.

The control part 12 is configured to be switchable between two modes, i.e., an operation mode in which a communication command including the address is sent out to the signal lines Ls according to the switch operation, and an address setting mode in which the address to be memorized is set in the built-in memory 13. Thus, the monitor and control apparatus 1 of the present embodiment has an address setting function for setting the address for every switch by the user.

In the operation mode, the control part 12 displays a load condition (operation condition of the load) received by the communication circuit 11 on the display part 2, and controls the load according to the displayed contents corresponding to the operation input of the operation part 3. Namely, the display part 2 is used for not only the operation part but also a load condition displaying part, which displays the present operation condition of each load as a monitoring controlled target. Therefore, the user can control the load according to the load condition by operating the operation part 3.

Figure 4:
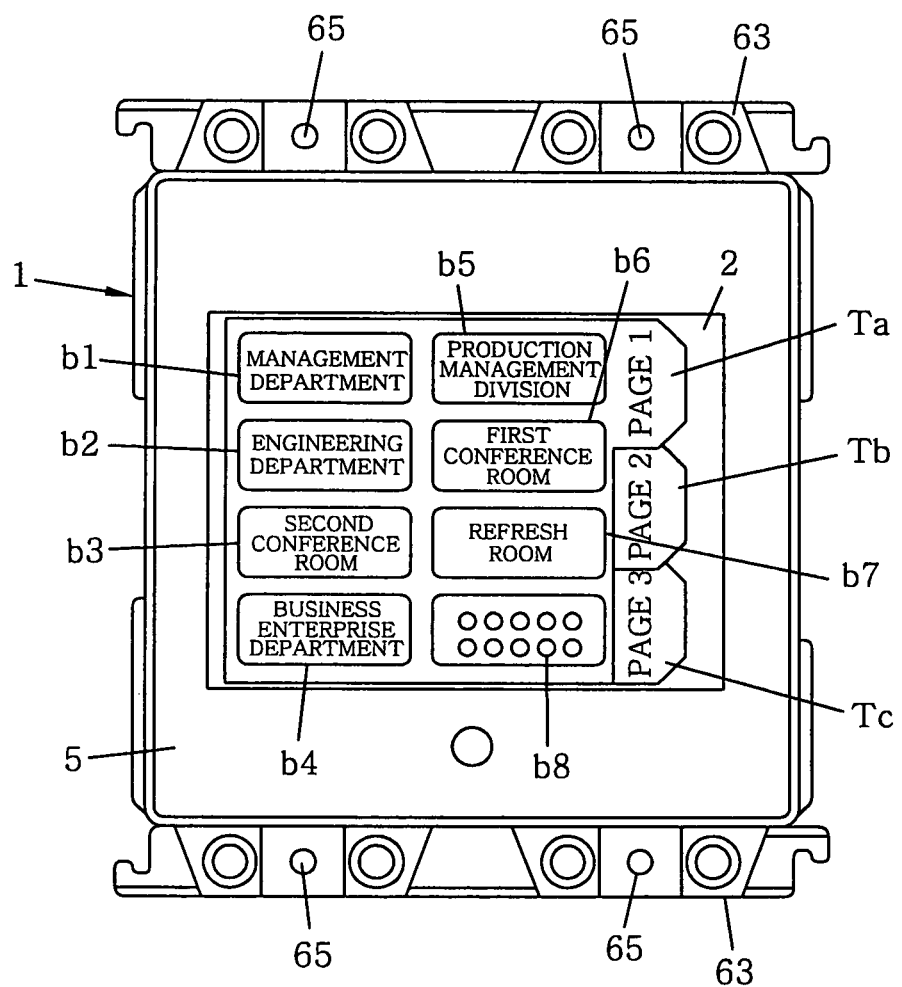
FIG. 4 is a front view of the monitor and control apparatus.
Figure 5:
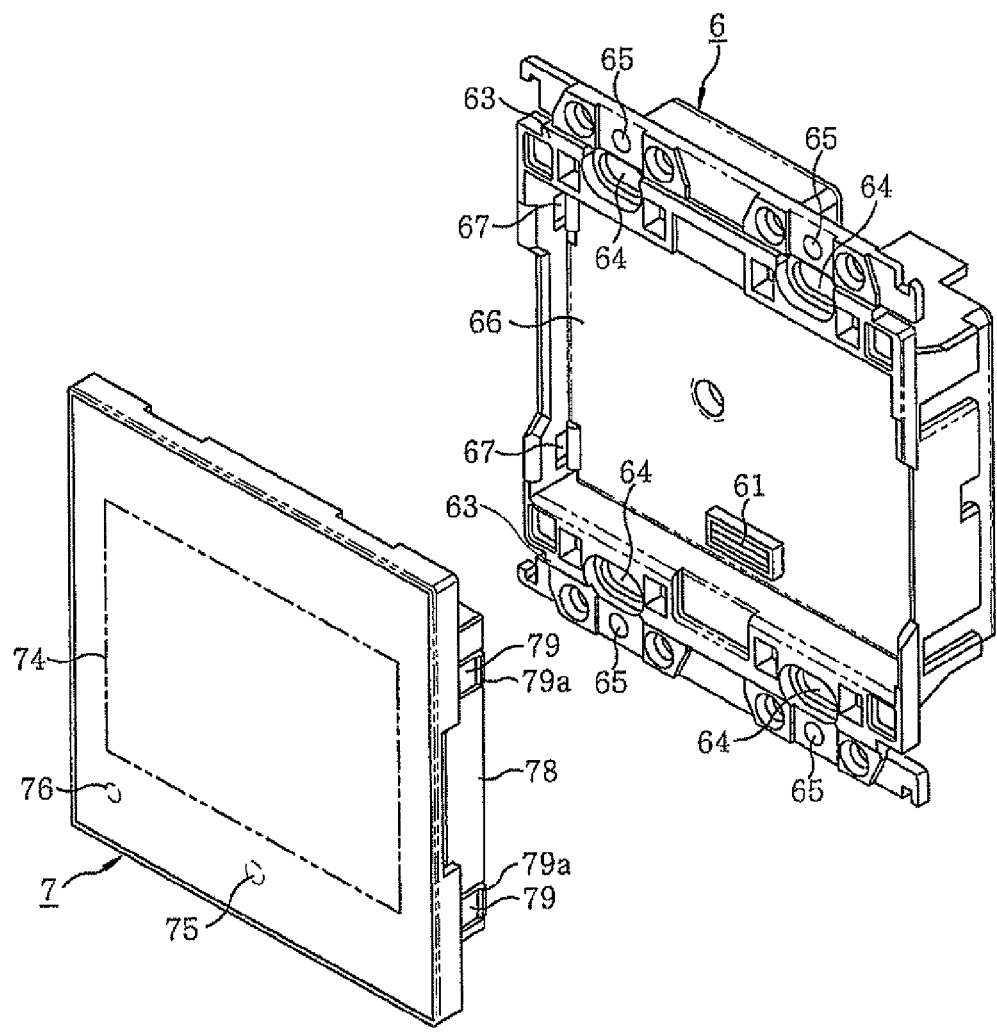
FIG. 5 is an exploded perspective view of the monitor and control apparatus.

Specifically, as shown in FIG. 4, the control part 12 displays an operation image including a plurality of operation buttons b1 to b8 on the screen of the display part 2, and portions of the operation part 3, which are overlapped with the operation buttons b1 to b8 on the screen of the display part 2, serve as the respective switches. By touching the switches (corresponding to the respective operation buttons b1 to b8) of the operation part 3, a user can give an operation input for controlling the load. At this time, among the addresses memorized in the built-in memory 13, a communication command including the address corresponding to the operated switch is sent out to the signal lines Ls. Thus, by operating any of the switches corresponding to the operation buttons b1 to b8, the user is able to control the load corresponding to the switch. Furthermore, in the operation image, each of the operation buttons indicates the operation condition of the load corresponding to the respective switches; for example, identifies ON/OFF conditions of the load by highlighting each of the operation buttons b1 to b8.

The monitor and control apparatus 1 has a plurality of loads as a monitoring controlled target. If all the operation buttons corresponding to the loads are displayed on the screen of the display part 2, a display size of the each operating button would become too small to recognize the load conditions, or an operation area of each of the switches (corresponding to each of the operation buttons) would become too small to operate. For that reason, in this embodiment, the number of the operation buttons displayed on the display part 2 is reduced and the contents displayed on the screen can be changed as desired, thereby enabling to display all the operation buttons corresponding to the plurality of loads. Specifically, in the monitor and control apparatus 1 of the present embodiment, the loads as a monitoring controlled target are classified into a plurality of load groups and a load condition for each load group displayed on the screen of the display part 2. Further, the load groups as a displayed target are changeable by clicking tabs Ta to Tc provided at the right side of the screen.

The monitor and control apparatus 1 of the present embodiment is provided with a box-like body 5 as shown in FIG. 1, which is attached to a wall in such a way that a rear portion of the body 5 is embedded in the wall, like an embedded type of wiring accessories. Note that an installation surface to which the monitor and control apparatus 1 is attached is not limited to the wall; for example, the monitor and control apparatus 1 may be attached to a face of fittings or a column. In the following description of the monitor and control apparatus 1, for the convenience of explanation, an up and down direction (vertical direction), and a left and right direction (horizontal direction) are defined based on the state where the monitor and control apparatus 1 is attached to the wall.

Figure 1A:
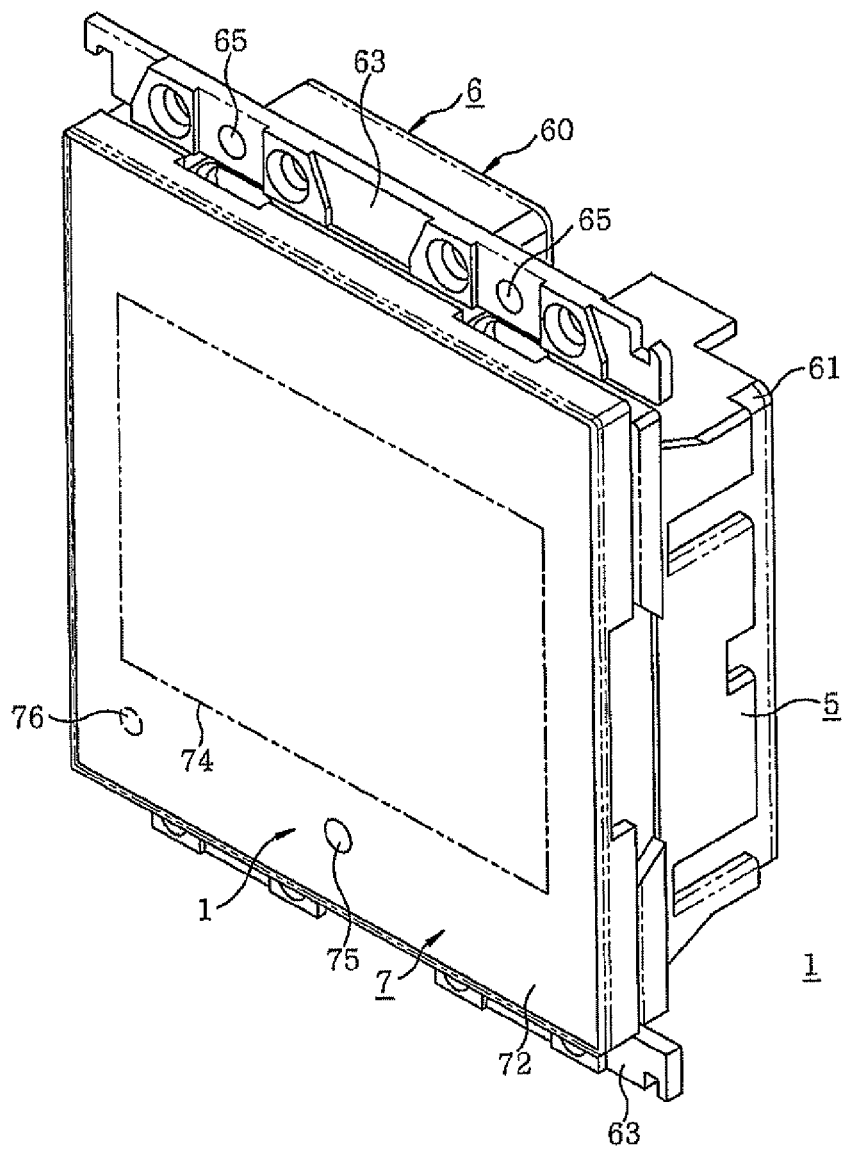

In the monitor and control apparatus 1, as shown in FIG. 1A, a display window 74 of a rectangular shape is formed in a part of a front face of the body 5, and the display part 2 and the operation part 3 are provided in the display window 74. In the front face of the body 5, a push button switch 75 is provided at a center of a lower portion of the display window 74 in the horizontal direction, and an LED window 76 for transmitting light from an LED (not shown) is provided in a left-hand side of the push button switch 75. Whenever the power supply of the monitor and control apparatus 1 is turned on, the LED is lit on to indicate the position of the monitor and control apparatus 1 to users in such as a dark room. The push button switch 75 is provided, for example, for disabling an operation of the operation part 3 forcedly. That is, when the push button switch 75 is pushed, from then, all the operations of the operation part 3 are nullified, so that it becomes possible to avoid an operation mistake of the operation part 3, for example, in the case where the front face of the body 5 is wiped. In this state, when the push button switch 75 is pushed again, from then, the operation of the operation part 3 becomes valid.

Figure 11:
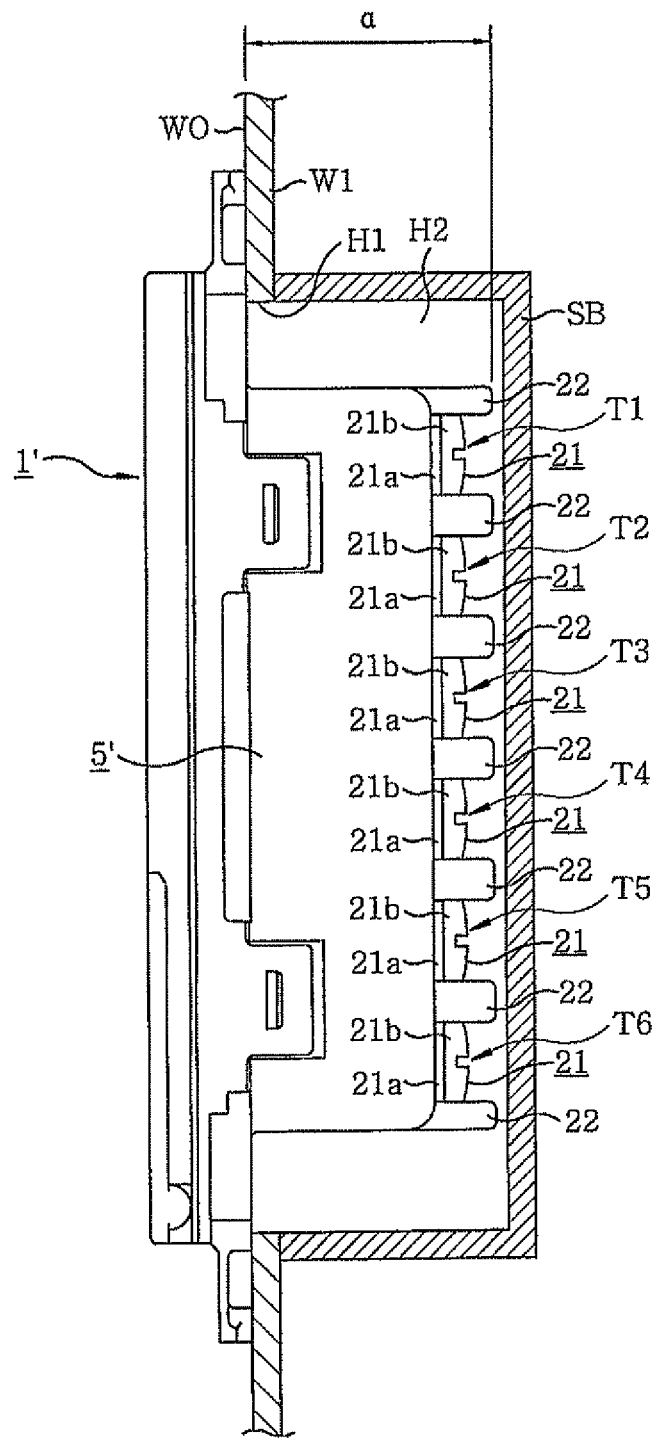
FIG. 11 is a cross-sectional view showing a mounting state of the conventional example.

Herein, in order to reduce costs of attachment members, the monitor and control apparatus 1 of the present embodiment is attached into a wall by using an embedded box SB (see FIG. 11) for fitting an embedded type of wiring accessories while reducing a protruding amount of the body 5 from the wall and harmonizing with an appearance of the embedded type of wiring accessories used generally and widely. In a wall face W0 (see FIG. 11) constructed by a wall material W1 (see FIG. 11), a fitting hole H1 (see FIG. 11) with a rectangular shape is opened in a part corresponding to the embedded box SB, and a mounting hole H2 for attaching the monitor and control apparatus 1 is provided in an internal space defined by the fitting hole H1 and the embedded box SB.

Since the body 5 is inserted into the embedded box SB from the front thereof through the fitting hole H1, the rear portion of the body 5 is formed to have a shape and dimensions adapted to be accommodated in the mounting hole H2. In the present embodiment, the body 5 is formed to have a width dimension of two serial modules that is twice a width dimension of a single serial module, wherein the width dimension of the single serial module is equivalent to a width dimension of a three-piece module (a dimension capable of attaching three wiring accessories with a unit size in a width direction), which is prescribed in JIS as a mounting frame for a large rectangular string wiring accessory. Namely, the body 5 is formed to have the size same as that of the embedded box capable of attaching two mounting frames with the width dimension of the single serial module. The body 5 also may be constituted by another configuration different from the above configuration.

Further, the monitor and control apparatus 1 can be divided into a body unit 6 fixed to the wall and a panel unit 7 detachably attached to the front side of the body unit 6. In the body unit 6, at least a power supply circuit 10 and a communication circuit 11 are accommodated, and in the panel unit 7, at least the display part 2, the operation part 3, the control part 12, and the built-in memory 13 are provided. The body unit 6 and the panel unit 7 are electrically connected with each other through a connector 61 of the body unit 6 and a connector (not shown) of the panel unit 7 that are provided on the opposite faces thereof, respectively.

The body unit 6 is, more specifically, formed to have a pair of mounting pieces 63 extended vertically continuously from an upper end and a lower end of the body unit 6, respectively. The mounting pieces 63 are provided to protrude from the front end part of the body unit 6 in the vertical direction and are extended over an approximately entire length of the body unit 6 in the horizontal direction. Each of the mounting pieces 63 has a plurality of box holes 64 (two holes in this embodiment) into which respective mounting screws are to be inserted, like a mounting frame which is used to fix an embedded type of wiring accessories into the embedded box SB. The body unit 6 is fixed to the embedded box SB by screwing the mounting screws through the respective box holes 64 to the embedded box SB in the state that the rear portion of the body unit 6 is inserted into the mounting hole H2 and the rear face of the mounting piece 63 is brought into contact with a periphery of the mounting hole H2 in the wall face WO. Further, in outer sides of the box holes 64 of the mounting pieces 63 in the vertical direction, there are provided plate fitting holes 65 for fixing a decorative plate (not shown) with screws so as to cover the mounting pieces 63 in a periphery of the front end parts of the body 5.

The panel unit 7 is formed to have a front face with dimensions approximately the same as that of the body unit 6 in the horizontal direction and slightly smaller than that of the body unit 6 in the vertical direction. Therefore, in the state where the panel unit 7 is attached to the body unit 6, all the front face of the body unit 6 is not covered with the panel unit 7. The portions in which the plate fitting holes 65 of the mounting pieces 63 are formed are exposed to both sides of the panel unit 7 in the vertical direction. However, the exposed portions are to be covered when the decorative plate is attached to the mounting piece 63. Here, a thickness dimension of the panel unit 7 (length in a forward and backward directions) is determined such that the protruding amounts of the panel unit 7 and the decorative plate from the wall face are approximately the same in the state that the decorative plate is attached to the mounting piece 63.

A fitting recess 66 is formed in the front side of the body unit 6, and locking holes 67 are provided in the left and right side faces of the fitting recess 66. In the rear face of the panel unit 7, a fitting protrusion part 78 to be engaged with the fitting recess 66 is formed to be protruded, and locking pieces 79 are provided in the left and right side faces of the fitting protrusion part 78. The locking pieces 79 are provided to correspond to the respective locking holes 67 when the fitting protrusion part 78 is engaged with the fitting recess 66. The locking piece 79 is of a cantilevered snap fitting type in which a locking claw 79a protruding outwardly from a tip end of the locking piece 79 is releasably engaged into the locking hole 67. Thus, the fitting protrusion part 78 is engaged with the fitting recess 66 to couple the panel unit 7 to the body unit 6 mechanically.

Figure 1B:
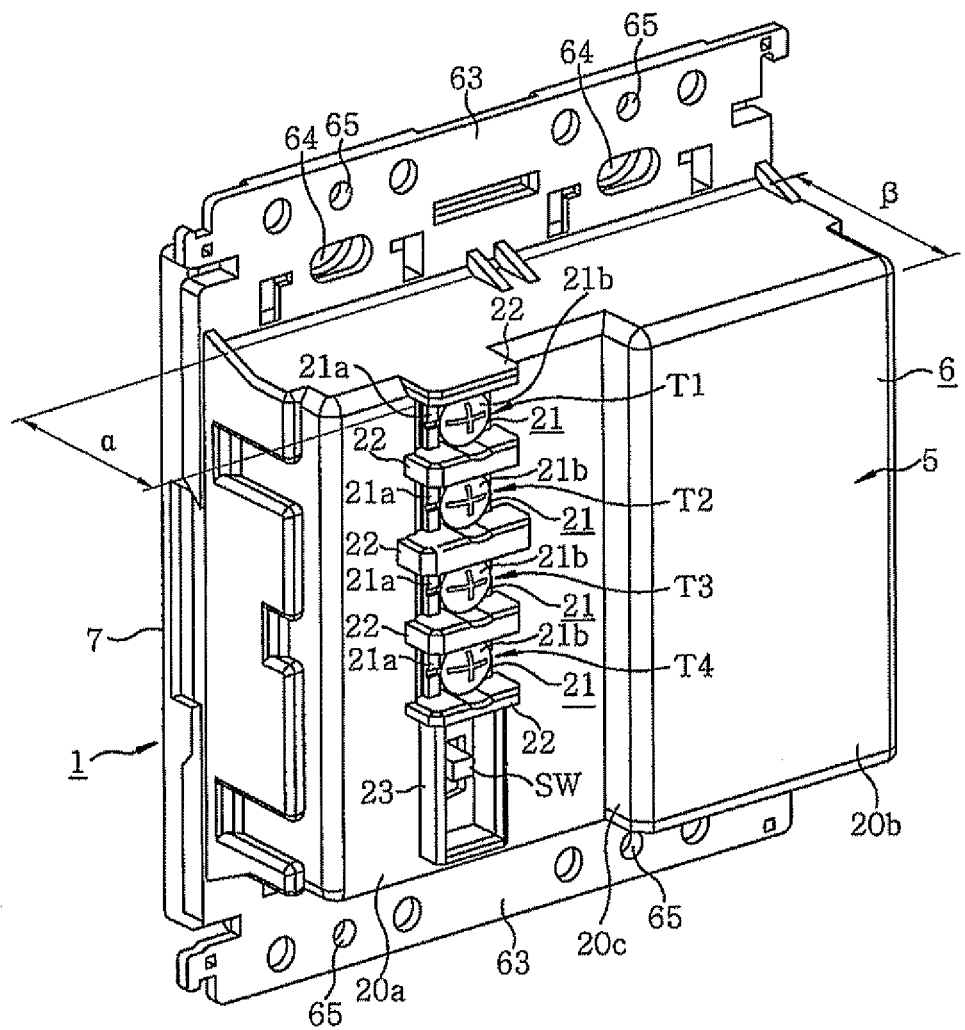

As shown in FIG. 1B, the monitor and control apparatus 1 of the embodiment is provided with: terminal sections T1, T2 for connecting the signal lines Ls; and terminal sections T3, T4 for connecting power supply lines that are to be connected to a remote control transformer Tr2 as needed, wherein the terminal sections T1, T2, T3, T4 are protruded from the rear face of the body 5 (the rear face of the body unit 6). The terminal sections T1 to T4 are arranged so as to be lined up along the vertical direction on the rear face of the body 5. The terminal sections T1 to T4 include: connecting terminals 21 to each of which an electric wire (signal line Ls or power supply line) is connected; and insulating walls 22 provided erectly at both of up and down sides of the connecting terminal 21 on the rear face of the body 5. The connecting terminal 21 includes: a terminal strip 21a pressed-in and fixed to a press-in hole (not shown) provided in the rear face of the body 5; and a terminal screw 21b to be screwed into a screw hole (not shown) of the terminal strip 21a.

The rear portion of the body 5 includes: a first face 20a from which the terminal boxes T1 to T4 are protruded; and a second face 20b that is protruded backwardly relative to the first face by a stepped portion 20c formed between the first face and the second face. Both the first face 20a and the second face 20b are parallel to the wall face W0 in the state where the body 5 is attached to the wall. In this way, the second face 20b in the rear of the body 5 protrudes backwardly to enlarge an internal space of the body 5 backwardly.

Figure 6A:
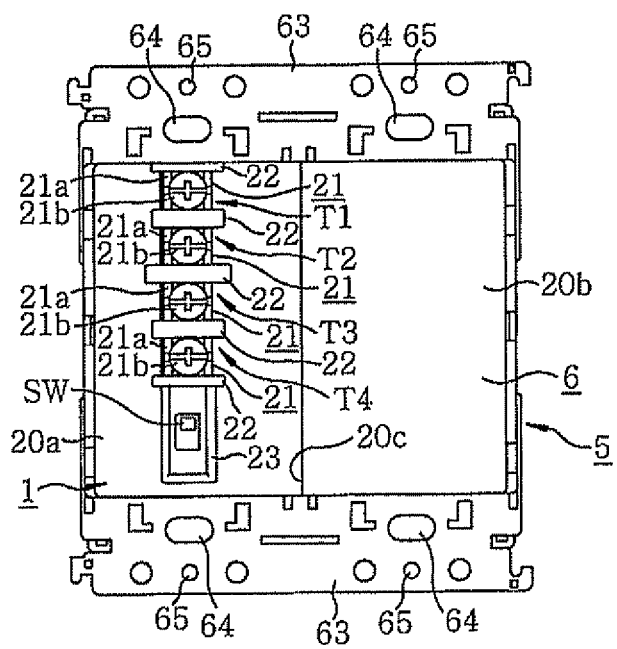
FIG. 6A is a rear view of the monitor and control apparatus.
Figure 6B:
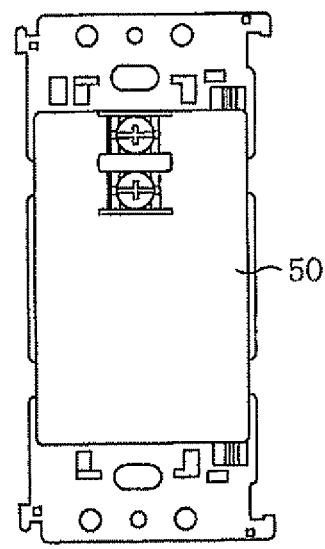
FIG. 6B is a rear view of a comparative example.

The stepped portion 20c is formed in the middle of the rear face of the body 5 in the horizontal direction, which defines a right-half portion (a left-half seen from the rear side) as the first face 20a, and a left-half portion (a right-half seen from the rear side) as the second face 20b. That is, the stepped portion 20c is, as shown in FIG. 6A, formed to divide the rear face of the body 5 into two parts by the width dimension of the single serial module, so that the first face 20a and the second face 20b have the same width dimension (the width dimension of the single serial module). FIG. 6B shows a body 50 having the width dimension of the single serial module as a comparative example of the body 5 of this embodiment.

The terminal sections T1 to T4 are formed in a center portion of the first face 20a in the horizontal direction. At a lower portion of the terminal boxes T1 to T4 in the first face 20a, there is provided a power supply changeover switch SW having a slide switch, which changes between two modes, i.e., one mode of obtaining an internal electrical power source from the transmission signal in the power supply circuit 10 and the other mode of receiving an electric power from a remote control transformer Tr2. Around the power supply changeover switch SW in the first face 20a, a peripheral wall 23 is formed erectly to surround the power supply changeover switch SW together with the insulating wall 22.

Of the terminal sections T1 to T4, the power supply changeover switch SW, and the peripheral wall 23, the insulating wall 22 of the terminal boxes T1 to T4 has the maximum protruding amount from the first face 20a. Besides, all the terminal sections T1 to T4 (insulating walls 22) are formed to have the same protruding amount from the first face 20a. Furthermore, the protruding amount of the terminal sections T1 to T4 from the first face 20a is set to be equal to the height dimension of the second face 20b from the first face 20a (i.e., the height of the stepped portion 20c).

Specifically, a dimension "α" (see FIG. 1B) is defined by adding the thickness dimension of the body 5 from the rear face of the mounting piece 63 to the first face 20a (the length in the forward and backward direction) and the height dimension of the terminal sections T1 to T4 (the protrusion dimension from the first face 20a). On the other hand, a dimension "β" (see FIG. 1B) is defined by adding the thickness dimension of the body 5 from the rear face of the mounting piece 63 to the first face 20a (the length in the forward and backward direction) and the height dimension of the second face 20b from the first face 20a. The dimension "α" is configured to be equal to the dimension "β". Consequently, when the body 5 is attached to the wall, the dimensions "α" and "β" become equal to an amount of the body 5 inserted into the mounting hole H2.

According to the configuration of this embodiment described above, due to the second face 20b protruded backwardly relative to the first face 20a, the body 5 is allowed to have a larger volume compared with the case where the second face 20b is formed to have the same height as that of the first face 20a, even when the dimensions "α", corresponding to the amount of the body 5 inserted into the mounting hole H2, is restricted by the depth dimension of the mounting hole H. This is the reason why the internal space of the body 5 is expanded by the amount of the protrusion in which a part of the rear face of the body 5 (corresponding to the second face 20b) is protruded backwardly.

As a result, the expanded internal space of the body 5 increases the number of components to be accommodated in the body 5, so that the monitor and control apparatus 1 of the present embodiment can be multi-functionalized by such as adding the address setting function described above. Further, since the expanded internal space of the body 5 enlarges a space between the components accommodated in the body 5, a heat generated from the components can hardly stay therein, so that a heat stress is advantageously reduced by improving the heat radiation properties of the body 5.

Moreover, the first face 20a is located forwardly relative to the second face 20b. Therefore, even when the dimensions "α" and "β" are set to the maximum value in the range of the depth dimension of the mounting hole H2 to make the second face 20b contact with the bottom surface of the mounting hole H2 (i.e., a front face of a rear wall of the embedded box SB), a considerable space is ensured between a part of the rear face of the body 5 (the first face 20a) and the bottom surface of the mounting hole H2. Namely, between the first surface 20a and the bottom surface of the mounting hole H2, there is provided a gap having at least the height dimension of the second face 20b from the first face 20a and the gap ensures a space for routing signal lines or power supply lines around the terminal sections T1 to T4 that are protruded from the first face 20a. Accordingly, the signal lines Ls or the power supply lines, which are connected with the terminal sections T1 to T4, can be drawn out of the mounting hole H2 through the hole (not shown) provided in the embedded box SB.

The upper limit of the dimensions "α" and "β" is restricted by the depth dimension of the mounting hole H2 which is determined by such as an embedded box SB to be used. However, for example, when the monitor and control apparatus 1 is supposed to be attached to a normal shallow embedded box SB, it is preferable that the amount of the body 5 inserted into the mounting hole H2 (dimensions "α" and "β") be set to 30 mm or less.

(Second Embodiment)

Figure 7:
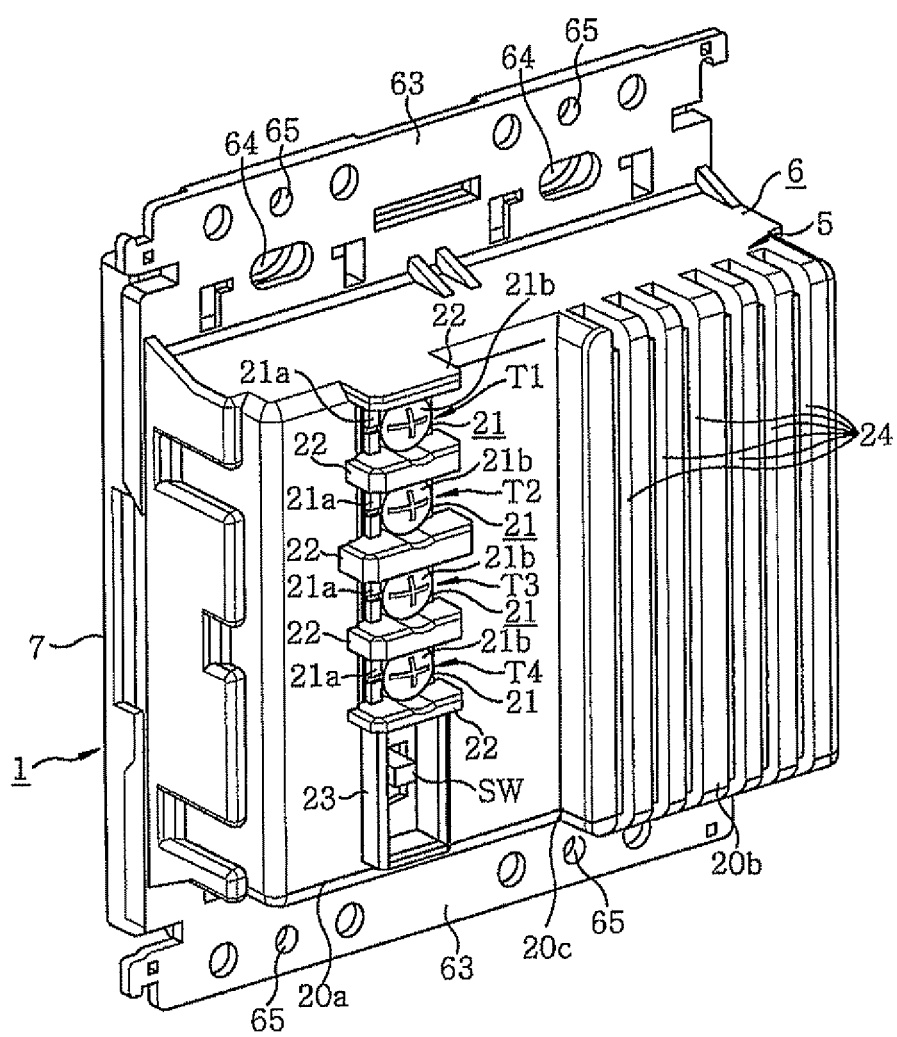
FIG. 7 is a perspective view seen from a rear side showing a configuration of a monitor and control apparatus in accordance with a second embodiment of the present invention.

The monitor and control apparatus 1 in accordance with a second embodiment of the present invention is, as shown in FIG. 7, different from the monitor and control apparatus 1 of the first embodiment in that heat dissipation holes 24 are formed through a rear wall of the body 5 in a thickness direction (in the forward and backward direction) to allow the internal space of the body 5 to communicate with the external space.

The heat dissipation holes 24 are formed into slits of which each has a predetermined width dimension and extends along the vertical direction, and a plurality of slits (six slits in this embodiment) are arranged side-by-side in the horizontal direction. All of the slits are formed to open the second face 20b in the rear face of the body 5. Here, each of the heat dissipation holes 24 is formed over a whole length of the second face 20b in the vertical direction, and furthermore extended to turn around forwardly from the up and down ends of the second face 20b.

According to the configuration described above, since the heat dissipation holes 24 serve to dissipate the heat generated inside the body 5 to the outside, the heat radiation property is improved compared with the case where no heat dissipation hole 24 is provided. The body unit 6 accommodates therein some components having a relatively great heat generation value, such as the power supply circuit 10. Such components are usually accommodated in the body 5 on the side of the second face 20b in which the internal space in the body 5 is expanded in the forward and backward direction, so that it is possible to efficiently dissipate the heat generated in such components owing to the heat dissipation holes 24 provided in the second face 20b.

The other configurations and functions are the same as those of the first embodiment.

(Third Embodiment)

Figure 8:
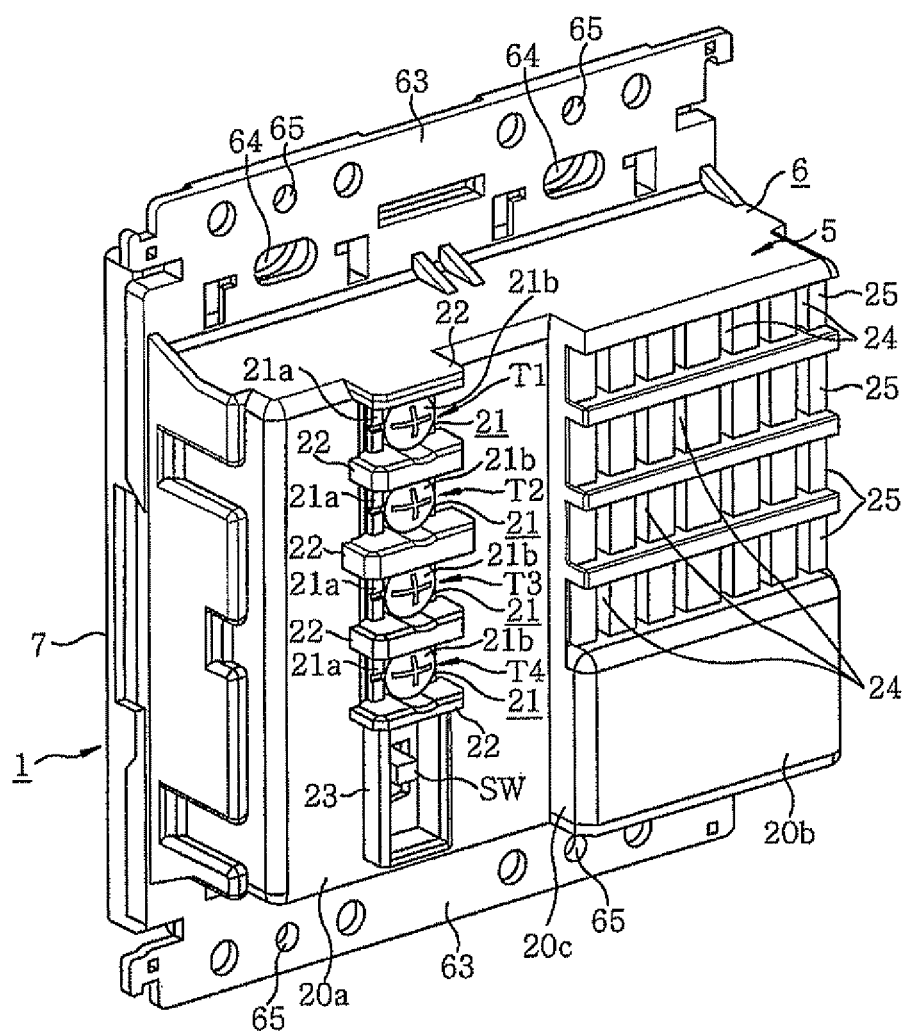
FIG. 8 is a perspective view seen from a rear side showing a configuration of a monitor and control apparatus in accordance with a third embodiment of the present invention.

The monitor and control apparatus 1 in accordance with a third embodiment of the present invention is, as shown in FIG. 8, different from the monitor and control apparatus 1 of the first embodiment in that a plurality of guide grooves are formed to be recessed in the second face 20b constituting the rear face of the body 5.

Each of the guide grooves 25 extends over a whole width of the second face 20b along the horizontal direction, and the depth dimension thereof is set smaller than the height dimension of the second face 20b from the first face 20a. Here, the guide grooves 25 are arranged so as to be aligned with the respective connecting terminals 21 of the terminal sections T1 to T4 in the horizontal direction. In other words, the guide grooves 25 are arranged side by side in the vertical direction to correspond to the respective terminal sections T1 to T4. In this embodiment, the heat dissipation holes 24 described in the second embodiment are formed only in the bottom of each guide groove 25, and these heat dissipation holes 24 improve its heat radiation property.

Figure 9:
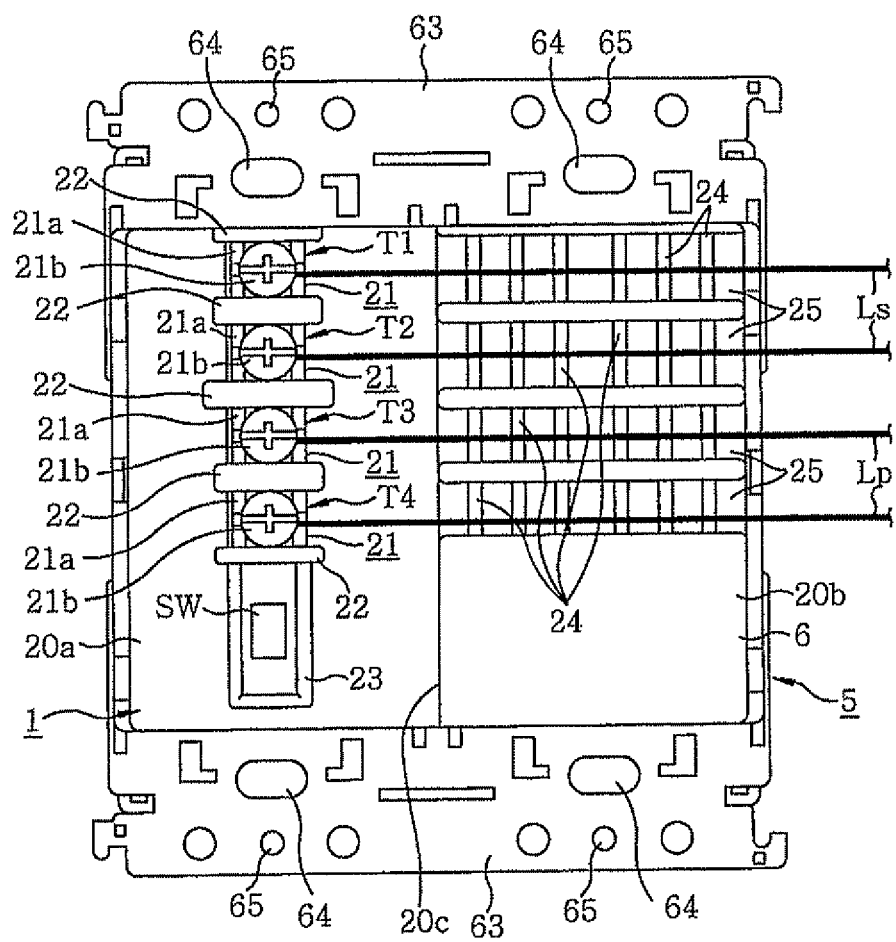
FIG. 9 is a rear view of the monitor and control apparatus of the third embodiment.
Figure 10A:
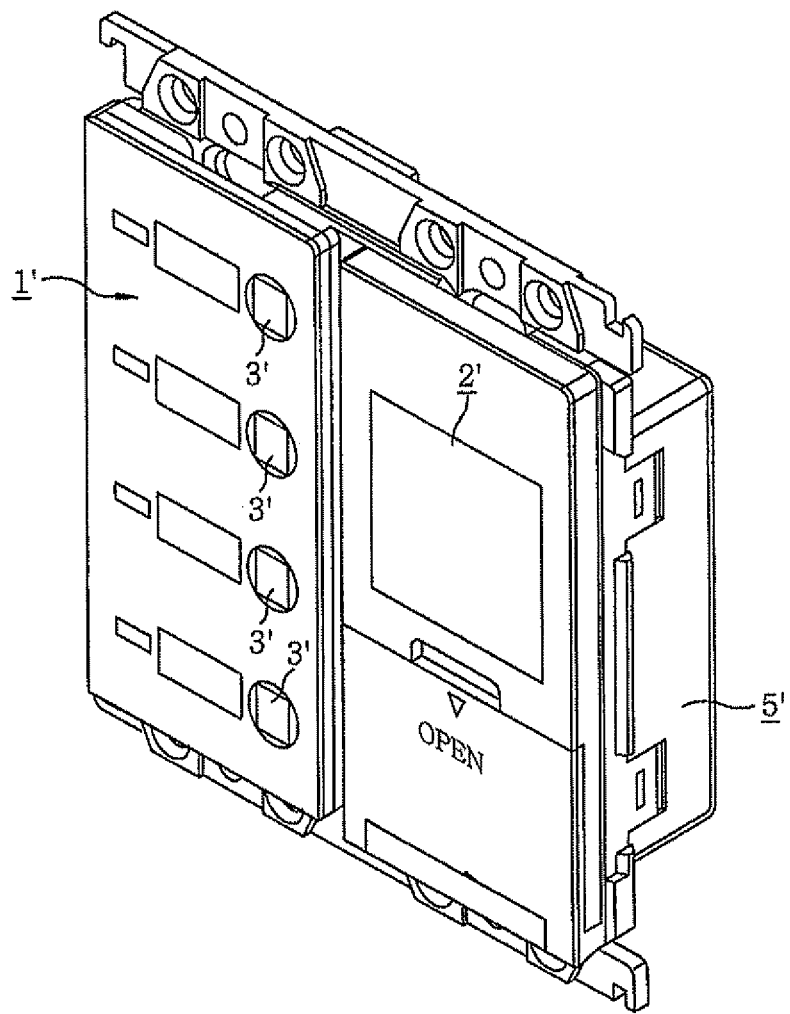
Figure 10B:
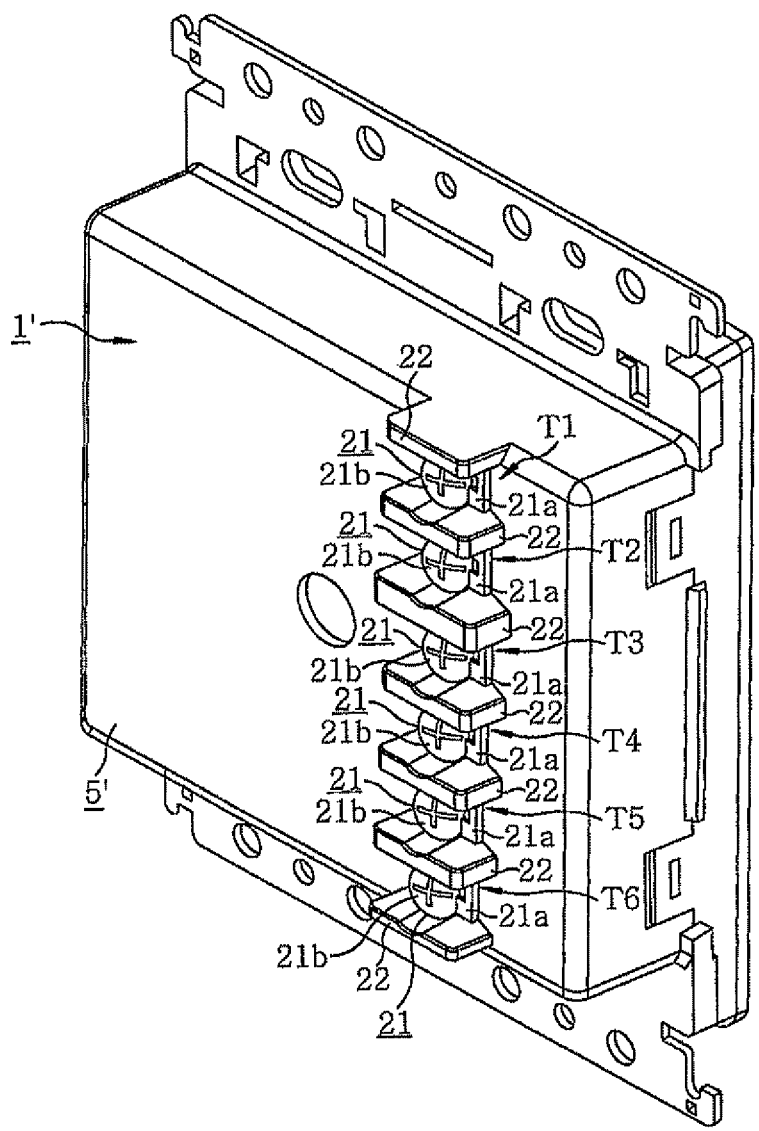

According to the configuration described above, the dimensions "α" and "β", of which each is an amount of the body 5 inserted into the mounting hole H2, are set to have the maximum value within the range of the depth dimension of the mounting hole H2. Therefore, even if the second face 20b is brought into contact with the bottom surface of the mounting hole H2 (i.e., the front face of the rear wall of the embedded box SB), each of the guide grooves 25 ensures a considerable space between the second face 20b and the bottom surface of the mounting hole H2. Accordingly, the signal lines Ls and the power supply lines Lp, which are connected to the terminal sections T1 to T4, are routed within the guide grooves 25 that are arranged laterally relative to the respective terminal section T1 to T4 as shown in FIG. 9. Therefore, it is possible to draw the signal lines Ls and the power supply lines Lp through the second face 20b (to the left-hand side of the body 5). Consequently, the signal lines Ls and the power supply lines Lp can be drawn flexibly in various directions. For instance, when the signal lines Ls and the power supply lines Lp need to be drawn through a through hole provided in a left side wall of the embedded box SB, the signal lines Ls and the power supply lines Lp can be drawn out of the mounting hole H2 without forcibly bending the signal lines Ls and the power supply lines Lp in the embedded box SB.

The other configurations and functions are the same as those of the first embodiment.

While the invention has been shown and described with respect to the embodiments, it will be understood by those skilled in the art that various changes and modifications may be made without departing from the scope of the invention as defined in the following claims.

What is claimed is:

1. A monitor and control apparatus connected with signal lines to be used for a remote monitoring control system for monitoring and controlling a load via the signal lines, comprising:

a body with a box-like shape attached to an installation surface in such a way that a front face of the body is exposed and a rear portion thereof is inserted into a mounting hole opened in the installation surface;

a display part for displaying graphic images;

an operation part through which a user inputs an operation instruction;

a control part for performing a display control of the display part and a load control according to the operation instruction through the operation part; and a communication circuit for transmitting communication commands for monitoring and controlling a plurality of loads, wherein the display part, the operation part, the control part and the communication circuit are provided in the body and the display part and the operation part are provided on the front face side of the body, wherein a rear face of the body includes: a first face having a plurality of terminal sections that are protruded, the signal lines being connected to the terminal sections; and a second face protruded backwardly relative to the first face by a stepped portion formed between the first face and the second face, wherein an internal space of the body on the second face side is enlarged backwardly more than that on the first face side, and a height dimension of the second face from the first face is substantially equal to a height dimension of the plurality of terminal sections from the first face;

wherein the plurality of terminal sections are arranged in parallel along the rear face of the body in a first direction perpendicular to a second direction in which the first face and the second face are arranged side by side, and wherein the body has a plurality of guide grooves formed in the second face to correspond to the respective terminal section in the second direction, the guide grooves extending along the second direction over an entire width of the second face.

2. The monitor and control apparatus as set forth in claim 1, wherein the body is configured to have a width dimension of two serial modules having twice a width dimension of a single serial module, the width dimension of the single serial module being equivalent to that of three-piece module standardized for an embedded type wiring accessories, and wherein the stepped portion is formed to divide the rear face of the body into two parts each of which has the width dimension of the single serial module.

3. The monitor and control apparatus as set forth in claim 2, wherein the body has one or more heat dissipation holes opened in the second face to allow the internal space of the body to communicate with an external space.

\* \* \* \* \*